US005894426A

United States Patent [19]

Ju

[11] Patent Number: 5,894,426

[45] Date of Patent: Apr. 13, 1999

[54] MAXIMUM/MINIMUM VALUE DETERMINATION APPARATUS

[75] Inventor: Shang-Tzu Ju, Chung Li, Taiwan

[73] Assignee: Winbond Electronics Corporation, Hsinchu, Taiwan

[21] Appl. No.: 08/959,451

[22] Filed: Oct. 28, 1997

[51] Int. Cl.$^{6}$ .................................. G06F 7/00; G06J 7/12

[52] U.S. Cl. ........................................ 364/715.06; 364/602

[58] Field of Search ........................ 364/715.013, 715.06, 364/724.014, 769, 602; 340/146.2

[56] References Cited

U.S. PATENT DOCUMENTS

| | | | |
|---|---|---|---|
| 4,410,960 | 10/1983 | Kasuya | 364/715.06 X |
| 4,774,688 | 9/1988 | Kobayashi et al. | 364/715.06 |
| 4,970,637 | 11/1990 | Sato | 364/715.06 |
| 5,715,186 | 2/1998 | Curtet | 364/715.06 |

*Primary Examiner*—Chuong Dinh Ngo
*Attorney, Agent, or Firm*—Foley & Lardner

[57] ABSTRACT

A maximum/minimum value determination apparatus for determining a maximum/minimum value between two digital signals includes two conversion modules each of which receives a first digital signal and a second digital signal and outputs a first analog signal and a second analog signal respectively, where the first analog signal and the second analog signal are respectively linearly related to the first digital signal and the second digital signal. A difference amplifier is connected to the two conversion modules for receiving the first analog signal and the second analog signal and outputting a selecting signal which is either a logical high signal or a logical low signal according to a difference between the first analog signal and the second analog signal. A first multiplexer is adapted to receive the first digital signal, the second digital signal, and the selecting signal and output a maximum of the first digital signal and the second digital signal according to the selecting signal. A second multiplexer adapted to receive the first digital signal, the second digital signal, and the selecting signal and output a minimum of the first digital signal and the second digital signal according to the selecting signal.

9 Claims, 3 Drawing Sheets

MAXIMUM/MINIMUM VALUE DETERMINATION APPARATUS

BACKGROUND OF THE INVENTION

1. Field of the Invention

The present invention relates to a maximum/minimum value determination apparatus for determining a maximum/minimum value between two digital signals especially used in image processing field. With the maximum/minimum value determination apparatus of the present invention, the amount of the transistors configured as a comparator for determining a maximum/minimum value can be considerably reduced, so is the size of the related IC chip which is integrated by the transistors.

2. Description of the Prior Art

An image processing technique applied in the digital integration circuit normally utilizes a comparator to compare different digital signals and then selects one from the digital signals according to the compared result. FIG. 5 illustrates a conventional circuit used to compare two digital signals and select a maximum/minimum one from the two. This conventional circuit comprises a binary comparator 50 and two multiplexers 60 and 70 which are connected to the binary comparator 50. The binary comparator 50 can determine the larger one of two digital signals A and B. When the digital signal B is greater than or equal to digital signal A, the binary comparator 50 outputs a high level signal (hereinafter simplified as "1"), otherwise a low level signal (hereinafter simplified as "0"). The output signal from the comparator 50 is used to be a selecting signal OUT for the two multiplexers 60 and 70. The multiplexer 60 outputs the maximum one of the two signals A and B according to the selecting signal OUT from the comparator 50. Specifically, when the selecting signal OUT is "1" the multiplexer 60 selects (outputs) the signal B, and when the selecting signal OUT is "0" the multiplexer 60 selects (outputs) the signal A. Similarly, the multiplexer 70 selects (outputs) the minimum one of the two signals A and B according to the selecting signal OUT from the comparator 50.

Although the above configuration can determine the maximum and the minimum one of two digital signals A and B, the cost thereof is relatively high due to too many transistors being required in an IC chip of the binary comparator. For example, in a 4-bit binary comparator 54 as shown in FIG. 6, many logic gates constituted by 48 transistors are required. This structure is too complicated and the chip size is relatively large.

It is requisite to provide a new structure which can determine maximum/minimum values with simplifier configuration and reduced size of the related IC chip.

SUMMARY OF THE INVENTION

The primary objective of the present invention is to provide a new maximum/minimum value determination apparatus which can determine maximum/minimum values with simplifier configuration and achieve a reduced size of its related IC chip.

In accordance one aspect of this invention, there is provided a maximum/minimum value determination apparatus for determining a maximum/minimum value between two digital signals comprising: two conversion modules each of which receives a first digital signal and a second digital signal and outputs a first analog signal and a second analog signal respectively, where the first analog signal and the second analog signal are respectively linearly related to the first digital signal and the second digital signal. A difference amplifier is connected to the two conversion modules for receiving the first analog signal and the second analog signal and outputting a selecting signal which is either a logical high signal or a logical low signal according to a difference between the first analog signal and the second analog signal. A first multiplexer is adapted to receive the first digital signal, the second digital signal, and the selecting signal and output a maximum of the first digital signal and the second digital signal according to the selecting signal. A second multiplexer is adapted to receive the first digital signal, the second digital signal, and the selecting signal and output a minimum of the first digital signal and the second digital signal according to the selecting signal.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
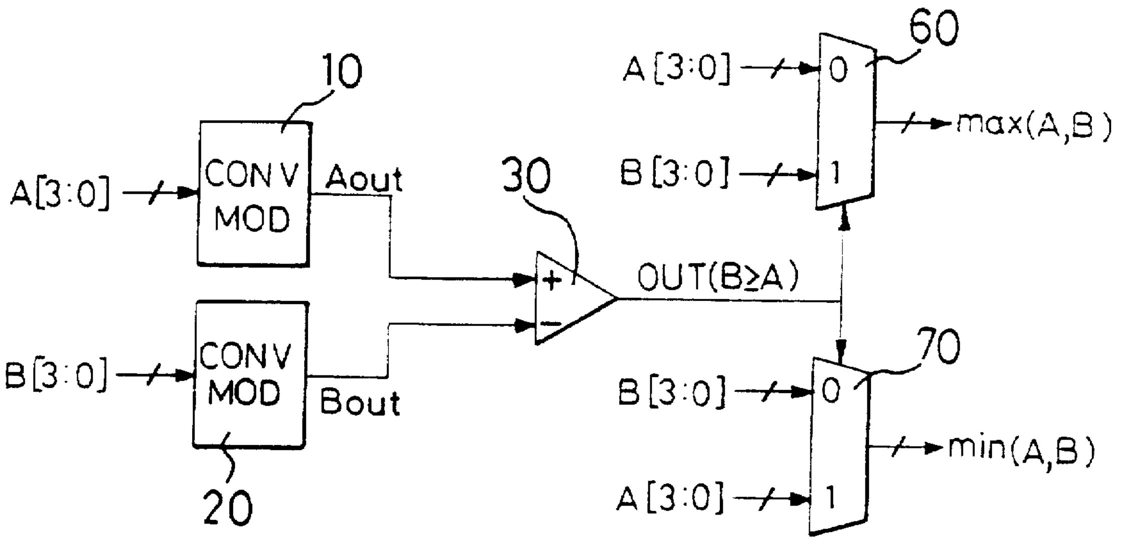
FIG. 1 is a block diagram illustrating a maximum/minimum value determination apparatus in accordance with the present invention for determining a maximum/minimum value between two digital signals.
Figure 5:
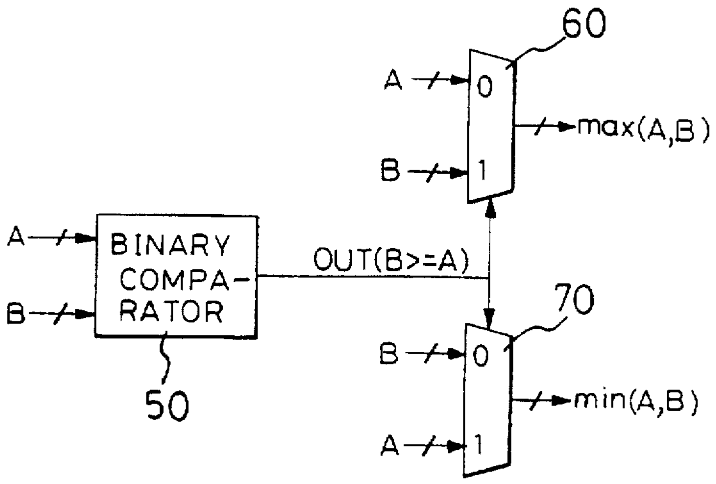
FIG. 5 is a conventional maximum/minimum value determination device.
Figure 6:
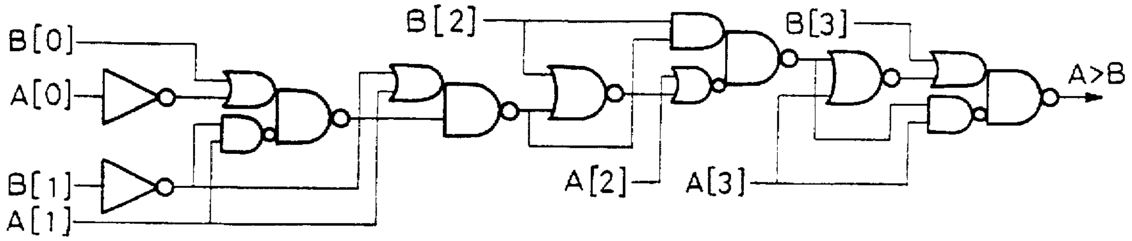
FIG. 6 is an example of a conventional 4-bit binary comparator.

Referring to FIG. 1, a maximum/minimum value determination apparatus for determining a maximum/minimum value between two digital signals is disclosed which comprises a first conversion module 10, a second conversion module 20, and a difference amplifier 30 which together replace the very complicated binary comparator 50 of the conventional maximum/minimum value determination apparatus. The first conversion module 10 and the second conversion module 20 respectively receive a first digital signal A[3:0] and a second digital signal B[3:0] and convert the two signals to a first analog signal Aout and a second analog signal Bout. The first analog signal Aout and the second analog signal Bout are compared with each other by the difference amplifier 30 which outputs a selecting signal OUT which is either in a logical high status or a logical low status according to the voltage difference between the two analog signals Aout and Bout. The selecting signal OUT from the difference amplifier 30 is coupled to the conventional multiplexers 60 and 70 which are configured the same as the conventional ones shown in FIG. 5. The multiplexer 60 outputs the maximum one of the two signals A and B according to the selecting signal OUT from the difference amplifier 30. Specifically, when the selecting signal OUT is "1" the multiplexer 60 selects (outputs) the signal B, and when the selecting signal OUT is "0" the multiplexer 60 selects (outputs) the signal A. Similarly, the multiplexer 70 selects (outputs) the minimum one of the two signals A and B according to the selecting signal OUT from the difference amplifier 30.

Figure 2:
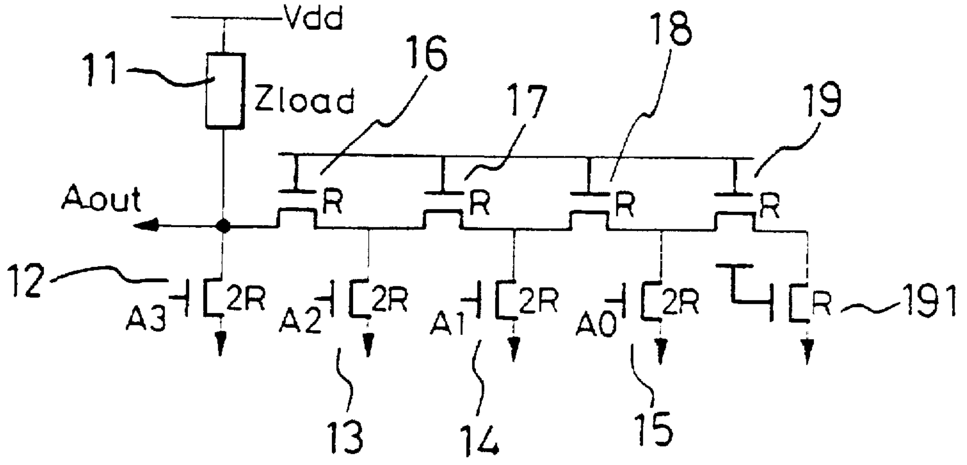
FIG. 2 is a circuit diagram of a converting module used in the present invention.

Referring to FIG. 2, the conversion modules 10 and 20 have an identical structure which, for example, the first conversion module 10, comprises a plurality of transistors 12, 13, 14, and 15 each having an inner resistance of 2R (R is not limited to a specific value) respectively connected to a corresponding one of data input terminals A3, A2, A1, and A0. The highest bit (the most significant bit) A3 is connected to a voltage source Vdd via a load Zload and the drain of the transistor 12 is an output terminal Aout of the conversion module 10. The drains of the transistors 12, 13, 14, and 15 are electrically connected one by one via transistors 16, 17, 18 each of which has an internal resistance R equaling half of the internal resistance of each of the transistors 12, 13, 14, and 15. The collector of the transistor 15 is connected to ground via two transistors 19 and 191 which respectively have an internal resistance of R. The internal resistances for example, R and 2R are obtained based on different widths of the gate in different transistors (the width of a gate of a transistor is in inverse proportion to the internal resistance thereof).

Figure 3:
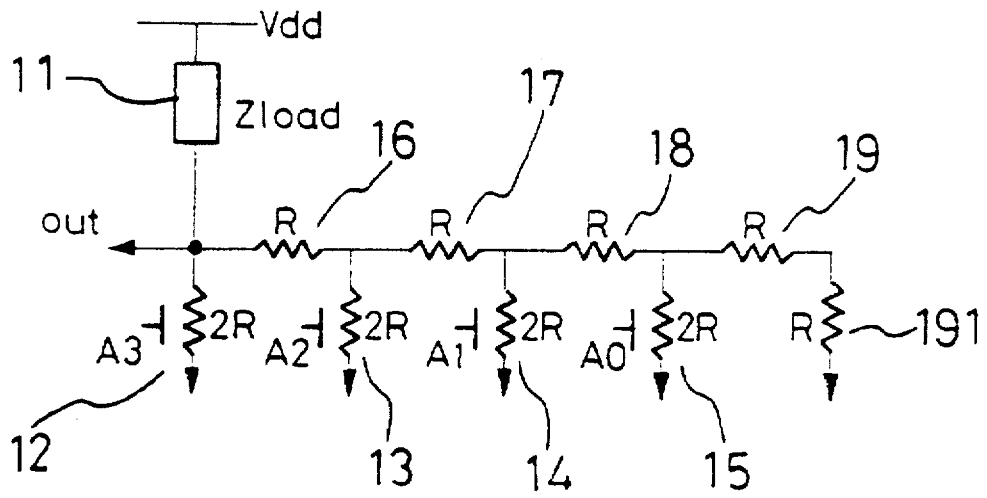
FIG. 3 is an equivalent circuit of the converting module of FIG. 2.
Figure 4:
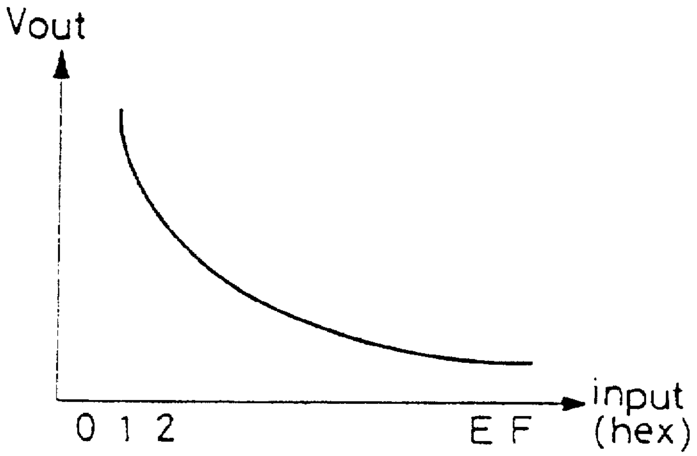
FIG. 4 is an input/output characteristics plot of the converting module.

An equivalent circuit of FIG. 2 is illustrated in FIG. 3 which has simulated the transistors as different resistors having internal resistances R and 2R respectively as described in FIG. 2. In this equivalent circuit, all the equivalent resisters are treated as voltage dividers, and the transistors 12, 13, 14, and 15 are treated as variable resistors each of which either has an unlimited resistance or a resistance of 2R. With this configuration, the output signal value has an inverse proportion relation to the value of the input digital signal A[3:0]. For example, the output signal has a maximum value when [A3, A2, A1, A0] are [0000], and a minimum value when [A3, A2, A1, A0] are [1111]. This converting module 10 merely needs ten transistors (including the load Z).

It can be appreciated from the above description that the new structure of the present invention can reduce the quantity of transistors by replacing the conventional comparator with two conversion modules and a difference amplifier. Each conversion module requires ten transistors and the difference amplifier also requires about ten transistors thus both the conversion module and the difference amplifier together require thirty transistors while the conventional comparator requires up to forty-eight transistors. Therefore, it is clear that the new structure of this invention can save costs in manufacture of the related IC chip. Moreover, the reduced amount of the transistors accordingly results in reduced size of the IC chip thus saving space.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A maximum/minimum value determination apparatus for determining a maximum/minimum value between two digital signals comprising:

two converting circuits each of which receives a first digital signal and a second digital signal and outputs a first analog signal and a second analog signal respectively, where the first analog signal and the second analog signal are respectively linearly related to the first digital signal and the second digital signal;

a comparing circuit connected to the two converting circuits for receiving the first analog signal and the second analog signal and outputting a selecting signal which is either a logical high signal or a logical low signal according to a difference between the first analog signal and the second analog signal;

a first selecting circuit adapted to receive the first digital signal, the second digital signal, and the selecting signal and output a maximum of the first digital signal and the second digital signal according to the selecting signal; and a second selecting circuit adapted to receive the first digital signal, the second digital signal, and the selecting signal and output a minimum of the first digital signal and the second digital signal according to the selecting signal.

2. A maximum/minimum value determination apparatus as claimed in claim 1, wherein each of the two converting circuits comprises a first set of transistors each of which functions as an input terminal for receiving a corresponding bit of the first digital signal.

3. A maximum/minimum value determination apparatus as claimed in claim 1, wherein each of the two converting circuits comprises a first set of transistors each of which functions as an input terminal for receiving a corresponding bit of the second digital signal and a second set of transistors connected with the first set of transistors.

4. A maximum/minimum value determination apparatus as claimed in claim 3, wherein each of the first set of transistors has a resistance twice that of each of the second set of transistors.

5. A maximum/minimum value determination apparatus as claimed in claim 1, wherein each of the two converting circuits comprises a plurality of voltage dividers for outputting an analog voltage according to the input digital signal.

6. A maximum/minimum value determination apparatus as claimed in claim 1, wherein the first analog signal and the second analog signal respectively have an inverse relation with the first digital signal and the second digital signal.

7. A maximum/minimum value determination apparatus as claimed in claim 1, wherein the comparing circuit is an operational amplifier.

8. A maximum/minimum value determination apparatus as claimed in claim 1, wherein the comparing circuit is an analog voltage comparator.

9. An apparatus for determining maximum/minimum value between two n-bit signals comprising:

two converters respectively receiving one of the two n-bit signals and comprising:

n switching devices each having a predetermined resistance value, a first end receiving a bit of the received n-bit signal for controlling the conduction thereof, a second end connected to a first power line, and a third end; and n+1 resistant devices connected in series and each having a half of the predetermined resistance value, a first open end of the n+1 resistant devices is connected to the first power line, and a second open end of the n+1 resistant devices is connected to a second power line through a load;

wherein the third ends of the n switching devices are respectively connected to the first n resistant devices connected in series from the second open end such that the signal at the second open end is linearly related to the value represented by the received n-bit signal;

a comparator for comparing the signals at the second open ends of the two converters and generating a selecting signal; and an output device for receiving the two n-bit signals and the selecting signal of the comparator and respectively outputting the maximum and minimum of the two n-bit signals according to the selecting signal.

* * * * *